United States Patent [19]

Edmeads

[11] Patent Number: 4,664,582
[45] Date of Patent: May 12, 1987

[54] TRUCK RESTRAINT SYSTEM
[75] Inventor: Ralph W. Edmeads, Willowdale, Canada
[73] Assignee: Mahaffy Materials Handling Ltd., Weston, Canada
[21] Appl. No.: 851,791
[22] Filed: Apr. 14, 1986
[30] Foreign Application Priority Data Oct. 18, 1985 [CA] Canada .................................. 493263

[51] Int. Cl.⁴ ............................................. B65G 67/02
[52] U.S. Cl. ..................................... 414/401; 14/71.1; 340/51
[58] Field of Search ....................... 414/401, 396, 584; 14/71.1; 340/51

[56] References Cited

U.S. PATENT DOCUMENTS

| 4,146,888 | 3/1979 | Grunewald et al. | 414/401 |
| 4,191,503 | 3/1980 | Neff et al. | 414/401 |
| 4,208,161 | 6/1980 | Hipp et al. | 414/401 |
| 4,264,259 | 4/1981 | Hipp | 414/401 |
| 4,267,748 | 5/1981 | Grunewald et al. | 414/401 |
| 4,282,621 | 8/1981 | Anthony et al. | 14/71.1 |
| 4,488,325 | 12/1984 | Bennett et al. | 414/401 X |
| 4,553,895 | 11/1985 | Ellis | 414/401 |
| 4,589,813 | 5/1986 | Hagen et al. | 414/401 |
| 4,605,353 | 8/1986 | Hahn et al. | 414/401 |

OTHER PUBLICATIONS

Brochure entitled "New Rite-Hite Dok-Lok".
Product Profile entitled "Locking Dock Features Truck Restraint System for Safety" of Serco Engineering Corp.
Brochure entitled "Kelly Truk Stop Automatic Trailer Restraining Device" and Owners Manual for Kelly Truk Stop.

Primary Examiner—Robert J. Spar
Assistant Examiner—Stuart J. Millman
Attorney, Agent, or Firm—Ridout & Maybee

[57] ABSTRACT

A restraining device for securing a parked vehicle to an adjacent structure. The device comprises a base plate having a first and a second end, the base plate being adapted to be rigidly secured to the adjacent structure so as to have its longitudinal axis oriented in a substantially vertical plane. A carriage plate slidably engages the base plate for longitudinal travel therealong between the first and second ends of the base plate. A drive cylinder is attached to the base plate and to the carriage plate for effecting the longitudinal travel of the carriage plate. A hooking member is pivotally mounted on the carriage plate so as to be movable between a stored orientation substantially parallel to the base plate and an operative orientation substantially perpendicular to the base plate. A housing is mounted on the base plate and adapted to repeatably guide the hooking member from the stored orientation to the operative orientation upon travel of the carriage plate between said first and said second ends, respectively.

9 Claims, 4 Drawing Figures

TRUCK RESTRAINT SYSTEM

This invention relates to a device for restraining a parked vehicle, such as a truck, to a loading dock or other adjacent structure, so as to prevent movexent of the vehicle, during loading and unloading.

It is common to have the restraining device bolted to or otherwise rigidly affixed to the loading dock or other adjacent structure. Such devices are typically fitted with a hooking member, which member is oriented perpendicularly to the adjacent structure, with the hook portion thereof opening upwardly. The hooking member is adapted to travel in a vertical direction so as to engage and disengage with the cross-blade of a downwardly projecting generally U-shaped bumper member positioned on the parked vehicle, known in the trucking industry as an "ICC" bar.

Known restraining devices, as typified by the device shown in U.S. Pat. No. 4,264,259 (Hipp), issued Apr. 28, 1981, are unsatisfactory because the hooking member extends substantially outwardly from the adjacent structure so that when smaller vehicles, such as pick-up trucks or vans, attempt to back up to the loading dock they are unable to get sufficiently close to allow efficient loading and unloading. Moreover, when the loading area is not in use, the protruding hooking member of the device becomes a safety hazard to passers-by. Additionally, the protruding hook member presents an obstacle for efficient snow removal from the loading dock area, particularly by motorized snow removal equipment.

These disadvantages may be overcome by adapting the hooking member to pivot in a horizontal plane so as to allow it, when not in use, to swing out of the way to a stored orientation generally parallel to the adjacent structure at the lowest point of the vertical travel. At the stored orientation only the housing of the restraint device extends outwardly from the adjacent structure. Moreover, the thickness of the housing is not significantly greater than the thickness of conventional bumper pads commonly found on loading docks. A restraint device according to the invention operates efficiently with both small and large vehicles, without the danger of damaging the rearmost portion of such vehicles. Such a device poses no serious safety hazard to passers-by, and allows for easy snow removal.

There is thus provided according to the invention a novel restraining device for securement of a parked vehicle to an adjacent structure. The device comprises a base plate having a first and a second end, said base plate being adapted to be rigidly secured to said adjacent structure so as to have its longitudinal axis oriented in a substantially vertical plane. A carriage means slidably engages the base plate for longitudinal travel therealong between the first and the second ends. A drive means is attached to the base plate and the carriage means for effecting the aforementioned longitudinal travel of the carriage means. A hooking member is pivotally mounted on the carriage means so as to be movable between a stored orientation substantially parallel to the base plate and an operative orientation substantially perpendicular to the base plate. A housing means is mounted on the base plate so as to be adapted to repeatably guide the hooking member from the stored orientation to the operative orientation upon travel of the carriage means between said first and said second ends, respectively.

In order that the invention may be readily understood, one embodiment thereof will now be described by way of example with reference to the drawings in which.

Figure 1:
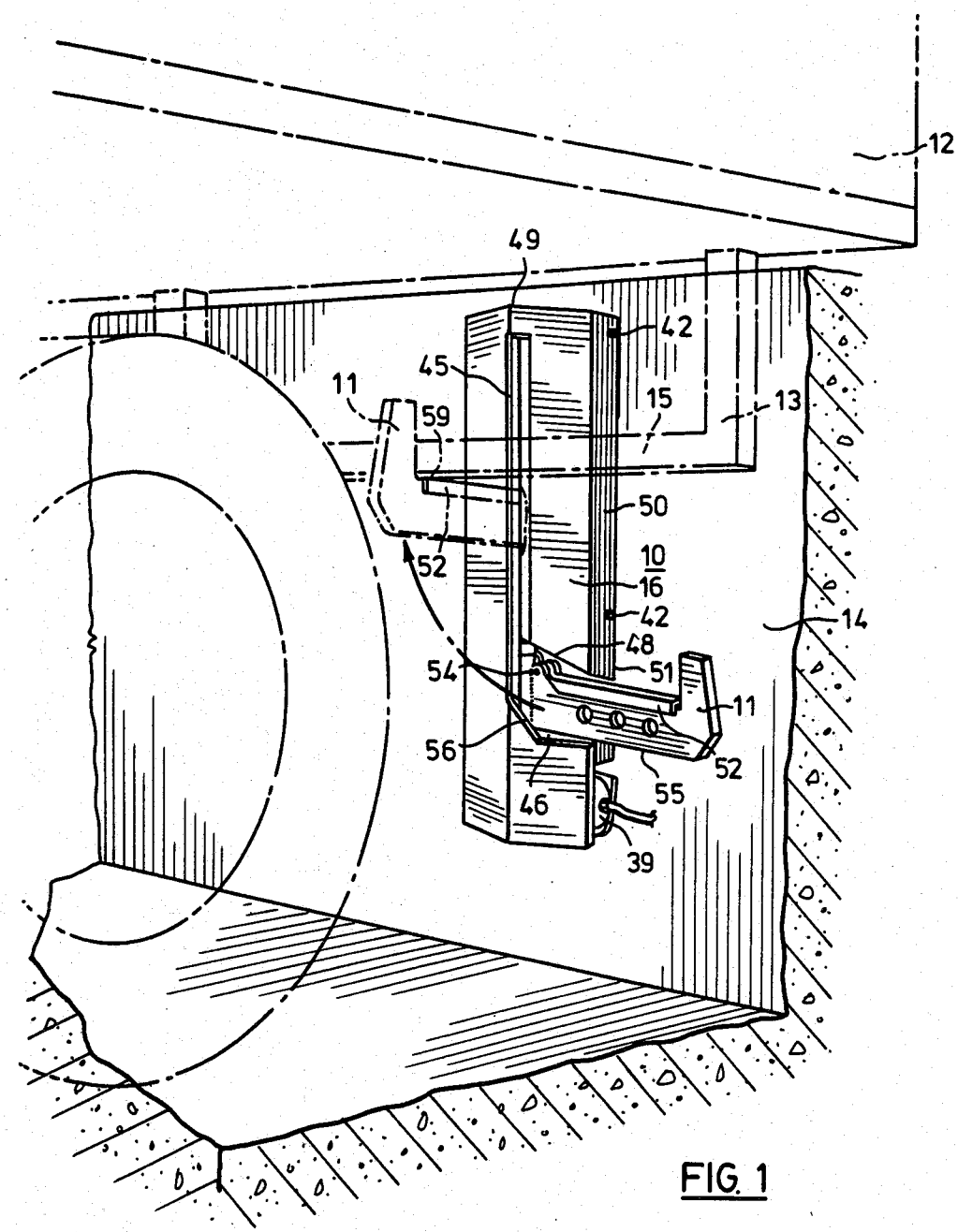
FIG. 1 is a perspective view of a device according to the invention showing, in solid lines, the hooking member in the stored orientation, and, in dotted lines, the hooking member in its operational orientation engaging the ICC bar of a parked vehicle.

FIG. 1 shows in dotted outline a truck 12, having a downwardly projecting generally "U"-shaped bumper element 13, commonly referred to as an "ICC" bar, which is parked for loading or unloading adjacent to a loading dock 14 of concrete or other material The truck 12 may be of the unitary type illustrated, or may be the trailer of a tractor-trailer combination, or other vehicle having a suitable bumper element 13. A restraining device according to the invention, designated by the general reference numeral 10, secures the truck 12 to the loading dock so as to prevent accidental or unintentional movement of the truck 12 during the loading or unloading operation. Such securement is effected by means of a hooking member 11 which moves from a stored orientation substantially parallel to the face of the loading dock 14 (shown in solid lines) to an operative orientation substantially perpendicular to the face of the loading dock 14 (shown in dotted lines), at which operative orientation the hooking member 11 engages with the cross-bar 15 of the ICC bar 13 to restrain movement of the truck 12. A housing means, comprising a cover member 16, is instrumental in guiding the hooking member 11 from the stored orientation to the operative orientation upon upward movement of the hooking member 11 as will become more apparent from the detailed description which follows.

Figure 2:
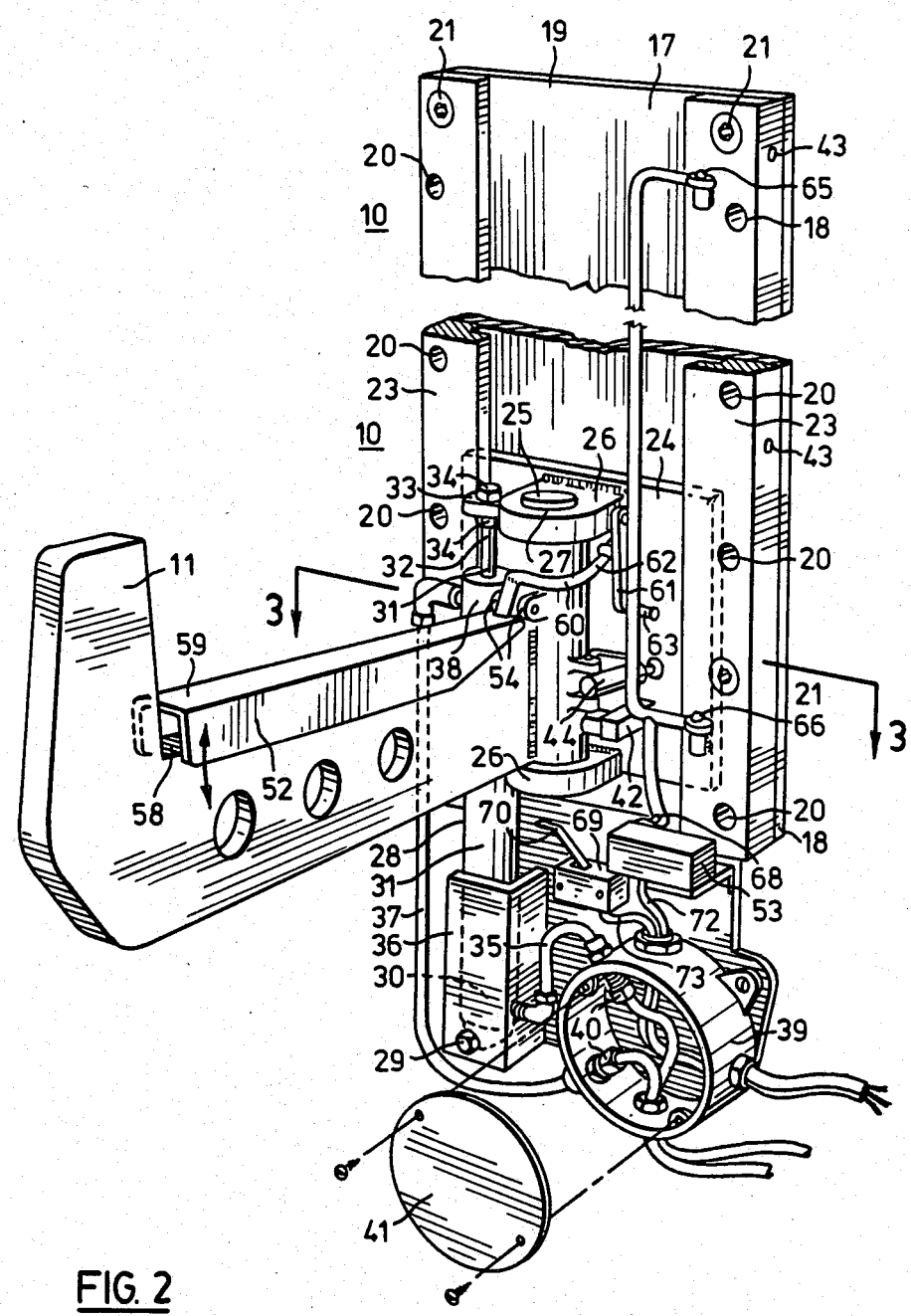
FIG. 2 is a perspective view of the device of FIG. 1, with the housing removed and the hooking member in the operative orientation.
Figure 4:
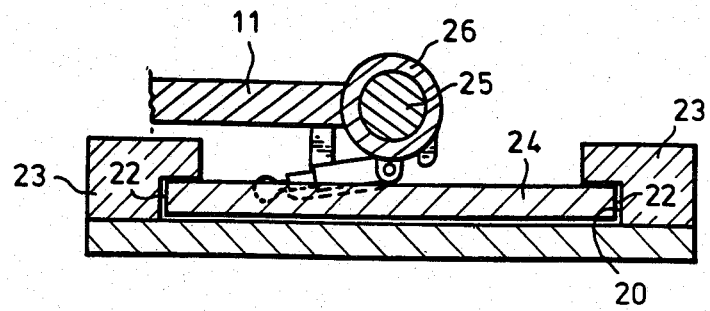
FIG. 4 is a sectional view similar to FIG. 3, but with the hooking member in the stored orientation.
Figure 3:
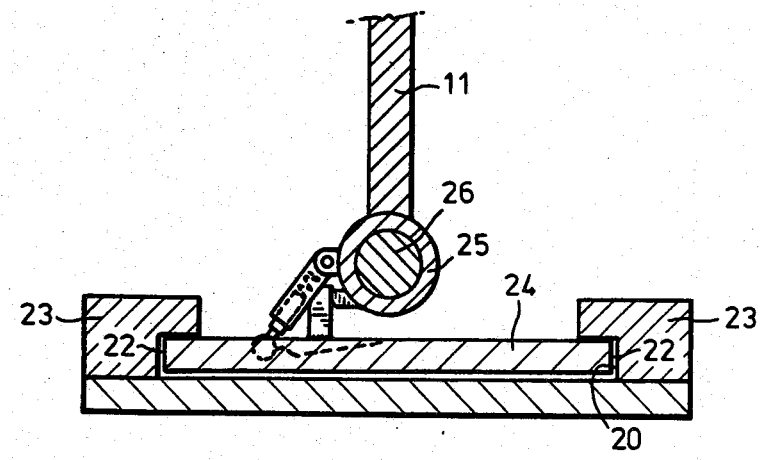
FIG. 3 is a sectional view along line 3—3 of FIG. 2.

FIGS. 2-4 show the restraining device 10 of FIG. 1 with the cover plate 16 removed. A base plate 17, having a first lower end 18 and a second upper end 19, is adapted to be rigidly secured to the loading platform 14, which is one example of an "adjacent structure" as that term is used in the claims, by the provisions therein of a number of mounting holes 20 dimensioned to accommodate an equal number of heavy mounting bolts (not shown) which pass through the holes 20 into the loading dock. In this manner, the base plate 17 may be secured to the loading dock 14 with its longitudinal axis oriented in a substantially vertical plane, as shown in the Figures. The base plate 17 additionally comprises two "L"-shaped flanges 23 which are secured to the base plate 17 by bolts or allen screws 21 so as to provide two opposed, parallel, vertically oriented guide channels 22. The mounting holes 20 also extend through the flanges 23 to accommodate the mounting bolts (not shown).

A carriage means, in the form of a carriage plate 24, slidably engages the base plate 17 for longitudinal travel therealong between the first 18 and the second 19 ends of the base plate 17 and is constrained for such movement by means of the flanges 23. The hooking member 11 is pivotally mounted on the carriage plate 24 by means of a pivot pin 25 which engages by opposite ends an aligned aperture 27 in each of two opposed ears 26 affixed to and protruding outwardly from the carriage plate 24. In this manner the hooking member 11 is movable from a stored orientation wherein its longitudinal axis is substantially parallel to the plane of the base plate (and, consequently, to the face of the loading dock 14), as shown in solid lines in FIG. 1, to an operative orientation wherein its longitudinal axis is substantially perpendicular to the plane of the base plate 17, as shown in dotted lines in FIG. 1. The carriage plate 24 is preferably provided with a stopper member 42 to limit the pivotal movement of the hooking member 11 towards the plane of the base plate 17, which stopper member 42 is dimensioned so that the axis of the hooking member 11 is substantially parallel to the plane of the base plate in its rest position.

The embodiment shown is optionally fitted with a spring and plunger apparatus 44 suitably mounted between the carriage plate 24 and the hooking member 11 such that when the angle between the axis of the hooking member 11 and the base plate 17 is less than approximately 90°, the apparatus 44 biases the hooking member towards substantial parallelism with the base plate 17, and such that when substantial perpendicularity of the axis of the hooking member 11 with the base plate is achieved, the apparatus 44 biases the hooking member 11 to maintain such substantial perpendicularity.

A drive means, in the form of a two-way pneumatic drive cylinder 28, has its main body portion 31 attached at its lower end 30 to the base plate 17 by means of a bolt 29, which bolt 29 first passes through a mounting bracket 36 attached to the base plate 17 before engaging the body portion 31 and the base plate 17. A push rod 31, being connected to the piston (not shown) of the drive cylinder 28, has a threaded upper end 32 which engages an apertured ear lug 33 affixed to and projecting from the carriage plate 24, with locking nuts 34 securing the push rod in such engagement. In this manner, the pneumatic drive cylinder 28 is attached to the base plate 17 and to the carriage plate 24 so as to effect the aforementioned longitudinal travel of the carriage plate 24 upon reciprocation of the piston (not shown) within the pneumatic drive cylinder 28.

A first air supply hose 35 is connected to the lower end 30 of the drive cylinder 28 to supply air under pressure to one side of the piston (not shown) so as to cause the push rod 31 to move upwardly thereby driving the carriage plate 24, with the attached hooking means 11, upwardly. A second air supply hose 37 is connected to the upper end 38 of the drive cylinder 28 to supply air under pressure to the other side of the piston (not shown) so as to cause the push rod 31 to retract downwardly, thereby driving the carriage plate 24, with the attached hooking means 11, downwardly. The air hoses 35, 38 are connected to an external source of pressurized air (not shown) at a junction box 39, by means of standard couplings 40, the junction box 39 having a removable cover plate 41. Known pneumatic control means (not shown) are used to regulate the flow of pressurized air to and from the air supply hoses 35, 38.

The cover member 16, constructed of heavy metal or other suitable material, is constructed so as to slope gently outwardly from a central longitudinal axis line 49 to meet the side walls 50 at an obtuse angle of approximately 105°. Routine trial and experiment will reveal other operative angles. The cover member 16 is removably mounted on the base plate 17 by means of bolts 42 which engage correspondingly threaded bores 43 in the guide flanges 23. The primary purpose of the cover member 16, apart from protecting the device from moisture, dirt and vandalism, is to guide the hooking member 11 from the stored orientation to the operative orientation as the carriage plate 24 and hooking means 11 travel between the first 18 and second 19 ends of the base plate 17. As shown, the cover member 16 has a substantially longitudinal opening 45 aligned along one edge with the axis line 49, which opening 45 coalesces adjacent the first end 18 of the base plate 17 with an angled opening 46 which extends from the longitudinal opening 45 through one side wall 50 to merge with the free edge 51 of the cover member 16, thereby allowing for the easy removal and replacement of the cover member 16 and for free pivotal movement of the hooking member 11 from the stored to the operation orientation. The longitudinal opening 45 is preferably provided on each of its two edges with a rubber or vinyl rain guard strip 47 to shield the underlying componentry from the elements.

In the stored orientation, the hooking member 11 protrudes through the angled opening 46. When the operator desires to raise the hooking member 11 so as to engage the ICC bar 13 of a vehicle 12, the pneumatic control means (not shown) are activated so that pressurized air is introduced into the drive cylinder 28 through the first air supply hose 35. This causes the hooking member 11 to move upwardly with the carriage plate 24, whereupon a signal bar 52 pivotally mounted on hooking member 11 comes into angled sliding contact with the upper edge 48 of the angled opening 46. The angling and the sloping of the upper edge 48 cause the hooking member 11 to pivotally move from the stored orientation to the operative orientation as the hooking member 11 rises, after which the hooking member 11 rises in the operative orientation while protruding through the longitudinal opening 45 until it initiates contact with the cross-bar 15. A pressure cut-out switch (not shown) may be incorporated into the device to shut off the pressure source (not shown) once such contact is obtained while maintaining the obtained contact pressure. Alternatively, the operative pressures can be sufficiently low (e.g. approximately 60 p.s.i.) such that continued running of the pressure source will not have any appreciable lifting effect on the vehicle 12, but will simply maintain engaging contact with the ICC bar 13. As shown, the angle of the upper edge 48 to the vertical is approximately 60°, but routine trial and experiment will reveal other operative angles.

When the operator desires to lower the hooking member 11 to release the parked vehicle 12, the pneumatic control means (not shown) are activated so that pressurized air is introduced into the drive cylinder 28 through the second air supply hose 37, and so that the pressurized air previously introduced into the cylinder on the opposite side of the piston (not shown) is exhausted through the first air supply hose 35. This causes the hooking member 11 to move downwardly with the carriage plate 24, whereupon the bottom edge 55 of the hooking member 11 comes into angled sliding contact with the corner edge 56 of the angled opening 46. The angling and the sloping of the corner edge 56 cause the hooking member 11 to pivotally move from the operative orientation to the stored orientation whereupon further pressurization is terminated by the operator, or by a pressure cut-out switch, (not shown). As shown, the angle of the corner edge 56 to the vehicle is approximately 45°, but routine trial and experiment will reveal other operative angles.

The restraining device shown incorporates a first switch means interconnected with an electric light signalling system (not shown) to indicate securement of the parked vehicle 12. This first switching means comprises a micro switch 53 mounted on the base plate 17. One example of a suitable micro switch is Model No.V9NLR manufactured by the Burgess Switch Company Ltd. of England. The micro switch 53 is activated by the signal bar 52, which is pivotally mounted on the hooking member 11 by means of pivot pin 57 and mounting ears 54, being biased to an upward position (best seen in FIG. 2) by means of a spring (not shown) mounted between the signal bar 52 and the upper surface 58 of the hooking member 11. Upon frictional contact of the signal bar 52 with the cross-bar 15 of a parked vehicle 12 (see FIG. 1), the signal bar 52 is depressed downwardly at its outer end 59, which movement in turn causes arced upward movement of an attached projection 60. The projection 60 has a tripping member 61 rigidly affixed to its free end 62, which member 61 presents a contact member 63 arranged so that upward arcing movement of the projection 60 causes the contact member 63 to move outwardly in the direction of the arrow of FIG. 2 to contact a control bar 64. The control bar 64 is pivotally mounted on the base plate 17 by pivot pins 65, 66 and presents an extension 67 which contacts the spring loaded push-button 68 of the micro switch 53. The control bar 64 is biased by the spring (not shown) of the micro switch 53 towards the base plate 17. It will be appreciated from the Figures that the control bar 64 is dimensioned so that the contact member 63 may contact the control bar 64 at any position of longitudinal travel of the carriage plate 24 when the hooking member 11 is in the operative orientation. In this manner, when the hooking member 11 is in the operative orientation, depression of the signal bar 52 depresses the push button 68 of the micro switch 53 through the agency of the control bar 64, thereby transmitting the movement of the signal bar 52 to the micro switch 53 at any position of longitudinal travel of the carriage means. Depression of the push-button 68 closes the micro switch 53. Wires 72 lead from the micro switch 53 to the junction box 39, where they may be connected in the usual manner to one or more appropriately wired signal lamps (not shown), which will thus be illuminated, indicating to the operator and/or the vehicle driver that the vehicle 12 is restrained.

The restraining device shown also incorporates a second switch means interconnected with the electric light signalling system (not shown) to indicate positioning of the hooking member 11 in the stored orientation. The second switch means comprises a micro switch 69 mounted on the base plate 17, with its tripping lever 70 upwardly directed in alignment with the lower pivot ear 26 of the carriage plate 24. One suitable micro switch is Model No. V9L manufactured by the Burgess Switch Company Ltd. of England. When the carriage plate 24 reaches its lowermost position of travel (i.e. when the hooking member 11 is in the stored orientation), the lower pivot ear 26 depresses the tripping lever 70 to close the micro switch 69. Wires 73 lead from the second micro switch 69 to the junction box 39, where they may be connected to appropriate signal lamps (not shown), which lamps will be different from the previously mentioned signal lamps connected to the first micro switch 53, and which will thus be illuminated indicating to the operator and/or the vehicle driver that the vehicle 12 is unrestrained and free to move on.

It will be understood that the invention is not to be limited to the exact construction shown and described, but that the various changes and modifications may be made without departing from the spirit and scope of the invention as defined in the appended claims. For example, the pneumatic drive cylinder 28 may be replaced by a hydraulic drive cylinder with a corresponding substitution of hydraulic control means for the pneumatic control means previously mentioned. Alternatively, the pneumatic drive cylinder 28 and the associated drive componentry illustrated may be replaced by an electric motor (not shown) in combination with a mechanical gear drive system and appropriate electrical control means to control the longitudinal travel of the carriage plate 24. Such changes are a matter of routined design choice the precise details of which are readily determined by any worker skilled in the art.

I claim:

1. A restraining device for securement of a parked vehicle to an adjacent structure, said device comprising:
    a base plate having a first and a second end, said base plate being adapted to be rigidly secured to said adjacent structure so as to have its longitudinal axis oriented in a substantially vertical plane;
    a carriage means slidably engaging said base plate for longitudinal travel therealong between said first and second ends;
    a drive neans attached to the base plate and to the carriage means for effecting said longitudinal travel of the carriage means;
    a hooking member pivotally mounted on the carriage means so as to be movable between a stored orientation substantially parallel to the base plate and an operative orientation substantially perpendicular to the base plate; and
    a housing means mounted on the base plate and adapted to repeatably guide the hooking member from said stored orientation to said operative orientation upon travel of the carriage means between said first and said second ends, respectively.

2. A device according to claim 1 wherein said housing means is adapted to guide said hooking member by means of a substantially longitudinal opening coalescing adjacent the first end with an angled opening extending therefrom, through which openings the hooking member protrudes.

3. A device according to claim 2 wherein said drive means is a pneumatic drive cylinder.

4. A device according to claim 2 wherein said drive means is a hydraulic drive cylinder.

5. A device according to claim 2 wherein said drive means is an electric motor in combination with a mechanical gear drive system.

6. A device according to claim 1 wherein a first switch means is provided, said switch means being interconnected with an electric light signalling system adapted to indicate securement of the parked vehicle.

7. A device according to claim 6 wherein said switch means is activated by the movement of a signal bar pivotally mounted on the hooking member so as to be depressed upon frictional contact of the parked vehicle with the signal bar upon longitudinal travel of the carriage means.

8. A device according to claim 7 wherein the switch means is mounted on the base plate and, when the hooking member is in the operative orientation, the signal bar activates the switch means through the agency of a control bar pivotally mounted on the base plate so as to transmit said movement of the signal bar to the switch means at any position of longitudinal travel of the carriage means.

9. A device according to claim 8 wherein a second switch means is interconnected with the light signalling system to indicate positioning of the hooking member in the stored orientation.

* * * * *